(12) United States Patent  (10) Patent No.: US 8,560,419 B2
Ricci  (45) Date of Patent: Oct. 15, 2013

(54) SYSTEM AND METHOD FOR DEVELOPING TECHNOLOGY ASSETS

(75) Inventor: Christopher P. Ricci, Dayton, OH (US)

(73) Assignee: Avaya, Inc., Basking Ridge, NJ (US)

( * ) Notice: Subject to any disclaimer, the term of this patent is extended or adjusted under 35 U.S.C. 154(b) by 943 days.

(21) Appl. No.: 12/284,233

(22) Filed: Sep. 19, 2008

(65) Prior Publication Data

US 2009/0216589 A1  Aug. 27, 2009

Related U.S. Application Data

(60) Provisional application No. 61/066,505, filed on Feb. 21, 2008.

(51) Int. Cl.
*G06Q 40/00* (2012.01)
*G06Q 40/06* (2012.01)

(52) U.S. Cl.
CPC ..................... *G06Q 40/06* (2013.01)
USPC .............. 705/36 R; 705/35; 705/39; 705/26; 705/1; 715/273; 715/234; 709/239; 713/164; 702/1; 707/100

(58) Field of Classification Search
USPC ............ 705/28, 36 R, 310, 26, 1, 35, 39, 40; 715/273, 234; 709/239; 713/164; 702/1; 707/100; 1/1
See application file for complete search history.

(56) References Cited

U.S. PATENT DOCUMENTS

| | | | |
|---|---|---|---|
| 7,433,884 B2 * | 10/2008 | Breitzman | 1/1 |
| 7,702,516 B2 * | 4/2010 | Fellenstein et al. | 705/310 |
| 8,429,089 B2 * | 4/2013 | Juang | 705/306 |
| 2003/0195764 A1 * | 10/2003 | Baker et al. | 705/1 |
| 2003/0225653 A1 * | 12/2003 | Pullman | 705/36 |
| 2005/0071174 A1 * | 3/2005 | Leibowitz et al. | 705/1 |
| 2005/0108118 A1 * | 5/2005 | Malackowski et al. | 705/30 |
| 2005/0228684 A1 * | 10/2005 | Pogodin et al. | 705/1 |
| 2007/0244837 A1 * | 10/2007 | Plow et al. | 705/36 R |
| 2007/0299683 A1 * | 12/2007 | Elliott | 705/1 |
| 2008/0215474 A1 * | 9/2008 | Graham | 705/37 |

OTHER PUBLICATIONS

EVVICA(TM), a valuation model for intellectual asset-rich businesses; McCutcheon, Gavin A; Measuring Business Excellence v12n2 pp. 79-96, 2008.*
Dreier LLP Launches Sports Marketing and Consulting Firm; PR Newswire, p NA, May 14, 2008.*
Intellectual Assets Warrant a Second Look; Information Week, p NA, Nov. 29, 2004.*

* cited by examiner

*Primary Examiner* — Tien Nguyen

(57) ABSTRACT

An automated method for developing new products within a development entity, comprises receiving respective catalogs of technology assets, each including at least one of a patent, trade secret, know-how, documentation, prototypes, pre-production units, production samples, tooling, and demonstration frameworks. Each catalog corresponds to a discrete pool of technology assets having subject matter in common. The development entity also receives, from the originating owner, title to each pool in exchange for an equity interest in the development entity and an option to re-acquire the pool upon payment of a reacquisition fee to at least one primary investor. Further development of each technology asset pool is funded by at least one primary investor, who receives an equity interest in the development entity in exchange for its capital investments. Costs expended by the development entity to develop new product concepts corresponding to each asset pool are separately tracked. If the re-acquisition option is exercised, these costs form the basis for calculating the fee to be paid. If not, monetization is achieved by selling and/or licensing elements the enhanced technology asset pool to a spin-off entity funded by at least one secondary investor.

11 Claims, 7 Drawing Sheets

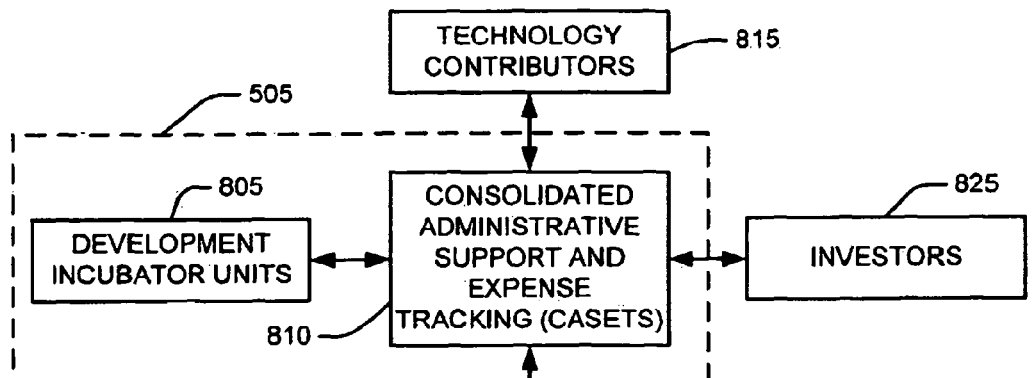
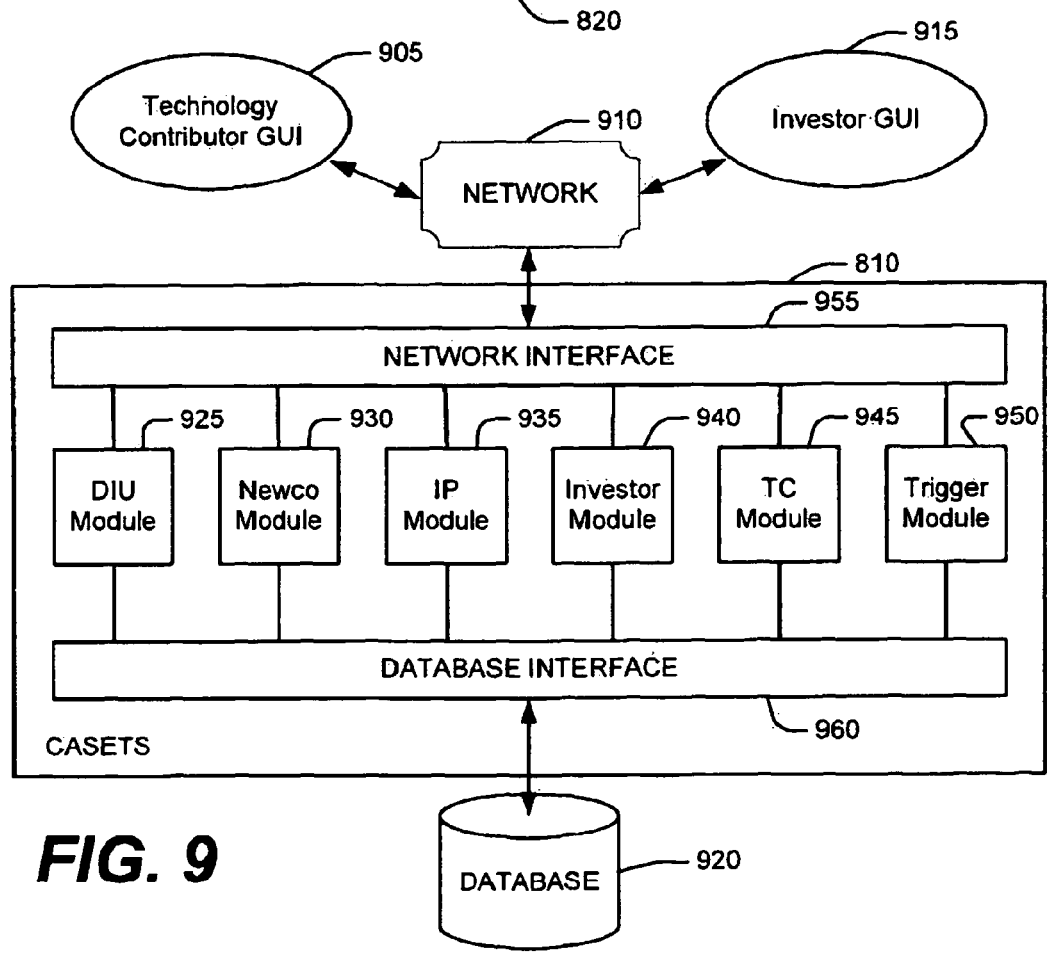
FIG. 8
FIG. 9

SYSTEM AND METHOD FOR DEVELOPING TECHNOLOGY ASSETS

REFERENCE TO RELATED APPLICATIONS

This application relates to U.S. Provisional Patent Application 61/066,505 filed Feb. 21, 2008.

BACKGROUND OF THE INVENTION

1. Field of the Invention

The present invention relates to systems and methods for extracting value from a portfolio of assets.

2. Discussion of the Prior Art

A successful, growing enterprise will generally reinvest a substantial portion of its revenue on research and development activities, the principal objective of doing so being to generate a pipeline of product ideas and, ultimately, a continuing stream of marketable products. To protect the inventions, works of authorship, and know-how which arise from such activities and, thereby to secure the anticipated benefits of emerging market opportunities, a large corporation may spend tens of millions of dollars or more annually on the filing of patent applications and copyright registrations and the maintenance of issued patents.

Often, an enterprise committed to protecting its investment in research and development will accumulate a substantial number of discrete asset portfolios each potentially consisting of a number of patents, copyrighted works of authorship, and know-how corresponding to a particular product or process concept or a related family of such concepts. When a product idea is regarded as a good fit with respect to a corporation's current or target customer base, the enterprise may spend millions of dollars on further product development, manufacture, and marketing. Conversely, even if a product idea has an immediate and accessible market, an enterprise may not incur the expenses of commercialization if it is perceived as not fitting within a pre-identified "core" or strategic focus area. The corporate owner knows that if its "stranded" IP assets remain where they are their value will likely diminish over time as the associated human capital and know-how disappears and the potential patent position stagnates or declines. In such cases, the enterprise may pursue other ways of extracting value from or "monetizing" the corresponding asset portfolio. A corporation seeking to monetize some or all of its intellectual property portfolio assets has heretofore been presented with a limited set of conventional options. These options include either the outright sale of a patent or set of patents, patent licensing or a wholly-owned, Joint-Venture-("JV")-based or Venture-Capital-("VC")-financed, spin-out.

The simplest monetization alternative is an outright sale of the patent. The buyer could be a company that is already operating in the technology space represented by the patent or one that is about to enter the field, or, with increasing frequency, the buyer may be an institutional patent aggregator. The former may be characterized as a strategic buyer and the latter as a financial buyer. The purchase price can be a lump sum, either in cash, stock, or a combination of the two, or it can involve a continuing revenue stream (a "tail") based on performance. In the latter case, the seller will usually retain a reversionary interest in the patent(s) such that if certain financial milestones are not met, ownership reverts to the seller.

If the seller is an operating company, sale of a patent may also involve retention of some rights under the patent by the seller via a reservation of rights or a grant-back license. The grant-back may be nonexclusive or, if the buyer and seller are in different fields (and the patent covers both), an exclusive license within the field of the seller's business. In either case, issues as to whether the grant-back license: a) includes sub-license rights; b) covers follow-on or improvement patents granted to the buyer; and/or c) survives change of control of the seller/licensee are important, are often contentious, and can be the subject of substantial negotiation.

Another monetization model involves the granting of one or more exclusive field-of-use licenses. Where the patent(s) cover not only the patent owner's products and markets but other applications as well, the patent owner may grant a third party an exclusive field-of-use license for all fields outside the owner's business. A well-known variant of this approach is for the patent owner to define "core" versus "non-core" applications of its patents to its business and grant nonexclusive licenses others for the non-core applications. Alternatively, instead of granting a single exclusive field-of-use license, the patent owner can define a number of non-overlapping applications of the patent, sometimes called "verticals," and grant an exclusive license within each vertical to a different party. Finally, to the extent that several parties are in different businesses and they each have patents covering both their business and the business of the other party, they can enter into exclusive field-of-use cross-licenses, whereby each party aggregates an exclusionary position in its field of interest.

Another monetization model utilizing a licensing transaction involves the granting of a nonexclusive license coupled with the transfer of know-how, technical support, etc. This is generally referred to as a technology license and represents the difference between "stick" licenses (the assertion model) and "carrot" licenses (the business opportunity model). In addition to the conventional research and development ("R&D") and intellectual property ("IP") licensing functions required to produce the know-how, this model further requires some form of customer support activity. The customer support activity assists the customer in integrating the licensed technology into its products or processes.

The final category of IP monetization strategy is the spin out. It is not unusual for a company to spin-out (or spin-off) a particular corporate business unit, division, or technology that is either no longer "core" to the business of the company or is not sufficiently profitable. The divestiture can be complete, i.e., the seller retains no further interest in the divested business (spin-off), or the seller can maintain an ongoing financial stake in the new venture (spin-out). And, as in the case of sale of patents per se, the seller may want to retain limited rights to the IP that is owned by the new entity, e.g., by way of an exclusive field-of-use grant-back license. One of the most difficult, and often contentious issues in the divestiture of less than an entire business is which patent rights remain with the seller and which go with the spin-out. This is typically resolved with some combination of ownership allocation via assignment and licenses to the non-owning party, which may be limited to the field of the retained business, and may be exclusive or nonexclusive (usually depending on the respective leverage of the parties). An illustrative monetization vehicle is the formation of a joint venture around a new corporate entity and the transfer by one or more of the joint venture partners of a subset of their patent rights to the new entity. For example, an aircraft manufacturer may have patents covering a local area network ("LAN") architecture for the control and communication systems on an aircraft, but the patent claims may be broadly written to cover "vehicles" rather than "aircraft." The aircraft manufacturer could form a new entity joint venture with an automobile manufacturer. In exchange for equity in the new entity, the aircraft manufacturer would contribute an exclusive field-of-use license under its LAN patents in the automotive field, and the auto manufacturer could contribute operating capital and management expertise in the automotive area. Another example involves companies in complementary but noncompetitive fields pooling their expertise and IP in a new area that exploits both partners' capabilities. In such a case, each partner would grant an exclusive field-of-use license to the new entity limited to the field of the new entity's business (which is defined so as to not overlap with the business of either joint venture partner). In addition, one or more of the partners could contribute operating capital, unpatented know-how, machinery and equipment, technical employees, and/or management executives to the new entity.

Each of the aforementioned IP monetization strategies enables the corporate owner of non-core, stranded IP and perishable technology assets (i.e., patents, trade secrets, know-how, documentation, prototypes, pre-production units, production samples, tooling and demonstration frameworks) to derive value from what would otherwise be unproductive assets. They all share a unifying disadvantage, however. Specifically, the outright sale or divestiture of an intellectual property asset to a third party or spin out entity is a permanent, irrevocable act. If the acquiring party uses a proprietary IP position to build a fast-growing, profitable business, the party which transferred that IP position may regret what had seemed like a good decision at the time. In that regard, an overly cautious management team will have a tendency not to act at all rather than take the chance of transferring what might later become a significant business opportunity. Such caution may very well be justified given that the decision to grant a license to or transfer ownership of an IP asset or portfolio is often made at a very early stage—i.e., before an invention has been fully developed or test marketed to gauge its prospects for commercial success.

A continuing need therefore exists for an IP monetization system and method which enables the corporate owner to maximize its return on research and development investments while preserving flexibility in the decision making process for as long as possible.

A need also exists for a system and method for striking a risk-reward balance among one or more corporate owners of IP asset portfolios and selected investors that will promote the formation of new business structures and/or lead to the commercialization of emerging technologies which would otherwise go unexploited.

Yet another need exists for an automated system which serves as an efficient platform for focusing financial and management resources on certain classes of non-core stranded IP and perishable technology assets in order to improve the underlying technology through adaptation and validation, and to extend intellectual property protection.

SUMMARY OF THE INVENTION

A computerized method for developing technology assets in accordance with an illustrative embodiment of the invention comprises storing in a database a re-acquisition record associating a Technology Contributor, a New Company; and the terms under which the Technology Contributor may re-acquire at least a portion of the transferred equity in the New Company. The illustrative embodiment further includes storing in the database a cost record associating the New Company and the Development Entity's costs associated with the New Company, storing in the database an investment record associating the New Company and the terms under which an Investor invested in the New Company. The illustrative embodiment further includes receiving a trigger and, in response, retrieving factors to be used to compute a re-acquisition amount the Technology Contributor should pay to re-acquire at least a portion of the New Company from the reacquisition record, the cost record, and the investment record, and reporting those factors.

The aforementioned needs are addressed, and an advancement is made in the art, by an automated method for developing new products within a development entity that comprises receiving respective catalogs of technology assets, each including at least one of a patent, trade secret, know-how, documentation, prototypes, pre-production units, production samples, tooling, and demonstration frameworks. Each catalog corresponds to a discrete pool of technology assets having subject matter in common. The development entity also receives, from an originating owner, title to each pool of technology assets in exchange for an equity interest in the development entity and an option to re-acquire the pool upon payment of a reacquisition fee to at least one primary investor.

The financial burden of any additional development activity needed to commercialize and/or broaden each technology asset pool may be shared with or entirely borne by one or more primary investors. The primary investor(s) receive an equity interest in the development entity, then, in exchange for an initial and any subsequent investments. The equity stake acquired by the primary investor(s) may be a majority or controlling interest.

Costs expended by the development entity to develop new product concepts corresponding to each asset pool are separately tracked. Thus, if the originating owner desires to re-acquire the technology assets (along with any improvements and enhancements thereto resulting from innovative development activity performed by the development entity), the actual costs may serve as a basis for calculating the fee to be paid. By way of illustrative example, the primary investor(s) and originating owner may agree up front that the re-acquisition fee will be a 5× multiple of the actual costs of all development activity and administrative overhead attributable to the asset pool to be re-acquired.

As an alternate exit strategy, the enhanced technology asset pool may be conveyed to a spin-off entity funded by at least one secondary investor. In this event, the development entity may receive an equity stake and/or a cash payment in consideration of the conveyance.

BRIEF DESCRIPTION OF THE DRAWINGS

The aspects of the present invention will become more apparent by describing in detail illustrative, non-limiting embodiments thereof with reference to the accompanying drawings, in which like reference numerals refer to like elements in the drawings.

FIG. 8 is a conceptual block diagram of one non-limiting example of a Development Entity cable of developing technology for a number of Technology Contributor/New Company/Investor groups.

FIG. 9 is a conceptual block diagram of one non-limiting example of a Consolidated Administrative Support and Expense Tracking System.

DETAILED DESCRIPTION

The techniques disclosed herein are directed to a new system and method for extracting value from a portfolio of assets. The novel processes comprising this model will have greater appeal to prospective clients in the business world, as well as the potential to extract a greater return on investment from classes of non-core stranded intellectual property and perishable technology assets within a large portfolio of technology assets owned by one or more originating corporate owners. Examples of these assets include, but are not limited to, patents, patent applications, copyrights, trademarks, trade secrets, know-how, documentation, prototypes, source and object code, pre-production units, production samples, tooling, demonstration frameworks, and even real property and specialized production equipment. To simplify the description hereinafter all types of assets are referred to herein as simply "assets" or "technology assets."

Figure 1:
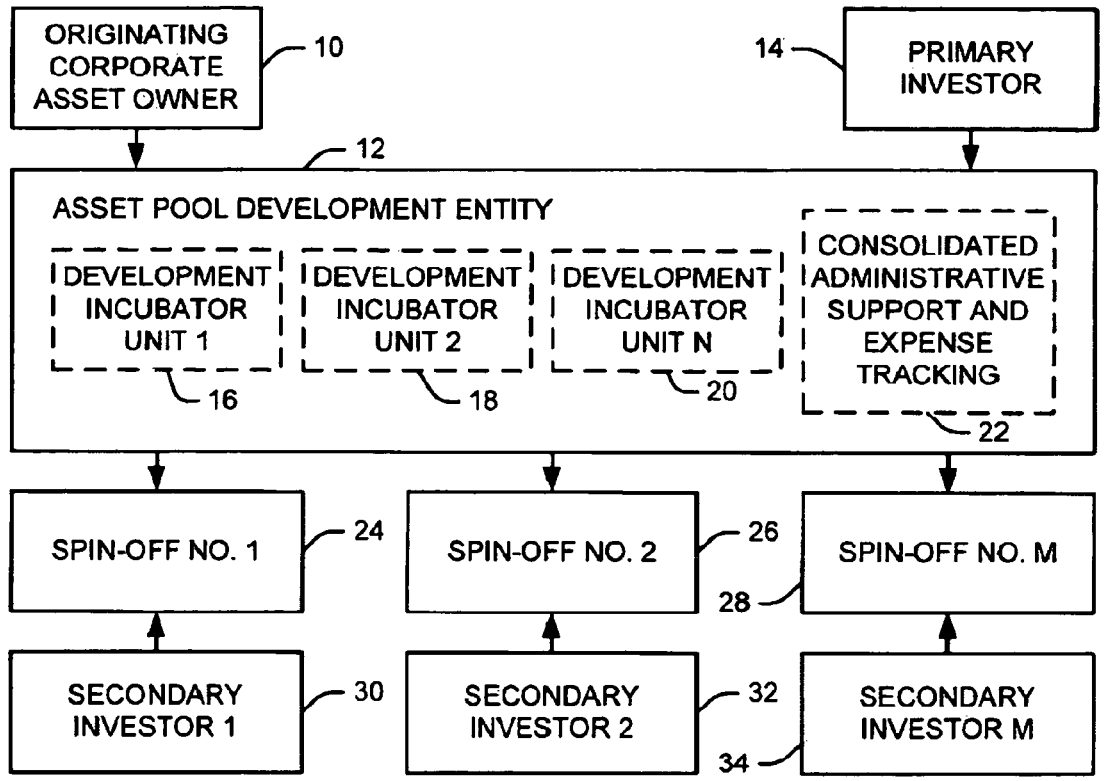
FIGS. 1 and 5 are conceptual diagrams representing a non-limiting embodiment of the relationships between the development/commercialization entity, the originating owner which contributes technology assets to the development entity, primary investor(s) who provide capital needed to establish and operate the development entity, and respective spin-off entities funded by one or more secondary investors.

The techniques described herein encompass the transfer of discrete pools of assets to a development entity, from the originating owner to a development entity, to which a "re-acquisition option" is offered to the originating owner. As illustrated in FIG. 1, in one embodiment the originating owner indicated generally at 10 transfers ownership of what it deems to be non-core assets to development entity 12, the assets being related in some way by subject matter. Patented and patentable inventions are especially suitable candidates for transfer because at their incipiency, it is usually difficult to assess their impact, market size and potential, and technological feasibility without a significant escalation in investment and, hence, risk. Advantageously, in one embodiment, development entity 12 is the vehicle by which the financial risks and rewards of further, needed development effort may be shared by participants with a higher level of risk tolerance such, for example, as primary (seed) investor 14. Other asset candidates include proofs of concept (which allow the estimation of the value-proposition of the invention), alpha prototypes (which demonstrate technological feasibility and physical proof that the technology delivers the intended value proposition for the targeted application), beta prototypes (most development and manufacturing costs have been resolved), and products which have "missing pieces" where the effort required to address the gaps is small relative to the potential value that would be created. Advantageously, the "reacquisition option" conveyed by development entity 12 back to originating owner 10, along with an equity stake, provides a sufficient incentive to overcome the corporate owner's instinctive desire to retain assets it has little likelihood of ever exploiting.

Figure 2:
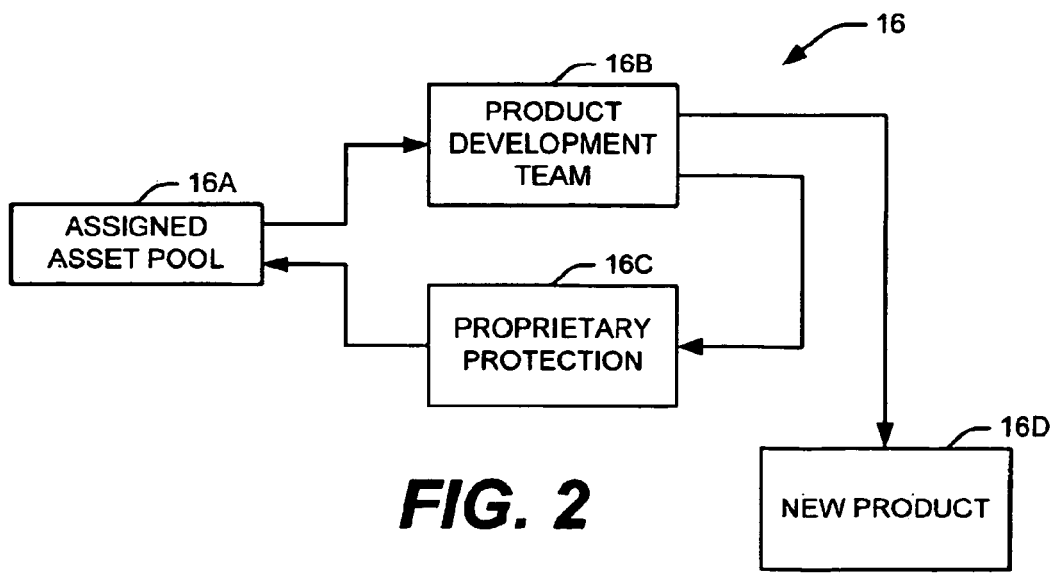
FIG. 2 is a conceptual diagram depicting a non-limiting embodiment of one of several development incubator units responsible for development/commercialization activity within the development entity, each incubator unit corresponding to one of the technology asset pools transferred to the development entity.

With continuing reference to FIG. 1, it will be seen in one embodiment that within development entity 12 are a number of development incubator units indicated generally at 16, 18, and 20, respectively. As will be explained in greater detail shortly, each incubator unit is responsible for the further development of one or more selected product concepts based upon inventions and other ideas embodied in a singular assigned asset pool. Turning briefly to FIG. 2, it will be seen that each incubator unit, such as incubator unit 16, includes an assigned asset pool 16A, and a group 16B of product development team members assigned the task of developing new innovations based upon the original assigned asset pool. Block 16C represents the creation of proprietary protection such as additional patents, copyrights and trade secrets as a result of the development activity, with these new assets being added to assigned asset pool 16A. Likewise, block 16D represents the creation of new products ready for commercialization.

Returning now to FIG. 1, it will be seen that, in one embodiment, development entity 12 further includes a consolidated administrative support and expense tracking function indicated generally at reference numeral 22. The progression from an initial patented or patentable invention to working prototypes, proofs of concept and commercialization candidates is typically an expensive one. In exchange for its initial capital investment, primary investor(s) 14 preferably receive a controlling equity stake in development entity 12. However, due to the existence of the re-acquisition option conferred upon originating owner 10, some mechanism is needed for providing primary investor 14 with an acceptable return on its investment. In accordance with an illustrative embodiment of the present invention, this rate of return is pre-negotiated between originating owner 10 and primary investor 14. By way of example, the parties may agree that primary investor 14 will receive a three to five times multiple of all expenses associated with the development activity performed by the corresponding incubator unit as unit 16. To the extent the incubator team further includes a management team charged with the creation of business plans, marketing strategies and assessments, and sales efforts, the parties might additionally agree that these members of the team may also receive a pre-negotiated exercise fee. Similarly, the technical members of the affected incubator unit may also receive a pre-negotiated exercise fee. In any event, it will be readily apparent to those skilled in the art based on the foregoing that the reacquisition option gives rise to a need for the development and administrative costs incurred by each incubator unit as units 16, 18 and 20 to be separately tracked by tracking function 22.

With continued reference to FIG. 1, it will be seen that, in one embodiment, a plurality of spin off entities indicated generally at reference numerals 24, 26, and 28 may be established, with each spin-off receiving a pool of assets from development entity 12 in exchange for a cash payment and/or an equity stake in the applicable spin-off. Advantageously, capital for the formation and operation of the spin-off entities may be provided by secondary investors, indicated generally at 30, 32, and 34, thereby affording the equity owners of development entity 12 with an opportunity to realize an immediate return on their investment.

Figure 3:
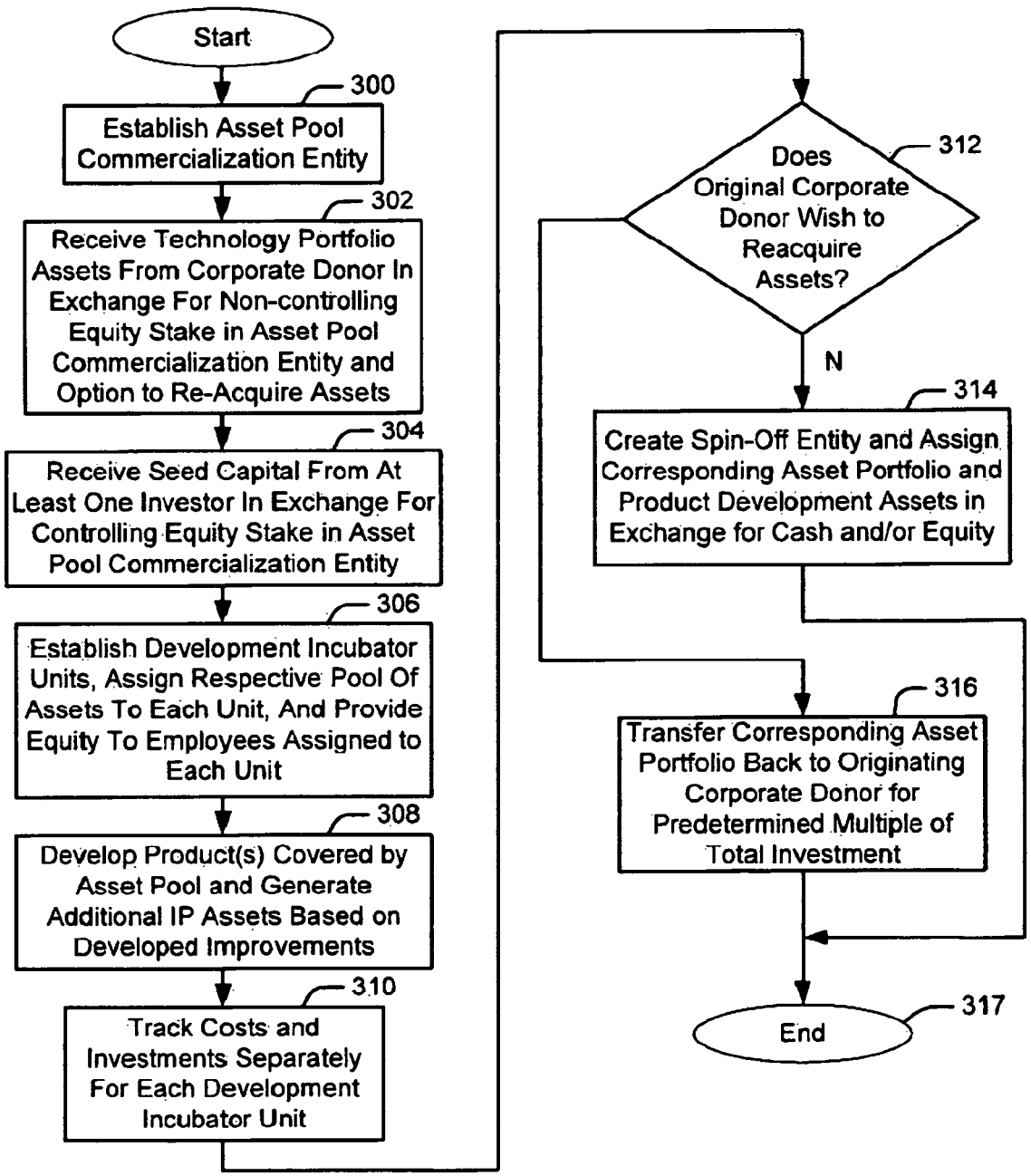
FIG. 3 is a flowchart depicting one non-limiting example showing a pool of unutilized, non-core technology assets being transformed by subsequent development activity into a more refined class of assets ready or nearly ready for commercialization by either a spin-off entity or the originating owner.

Turning now to FIG. 3, a flow chart depicting the development of asset pools in accordance with the teachings of the present invention will be described. As seen in FIG. 3, in one embodiment the process is initiated at 300 with the establishment of an asset pool development/commercialization entity. The entity may take any traditional corporate form such, for example, as a limited liability company (LLC), an S-corporation, or a C-corporation.

In one embodiment, at 302, a catalog or listing of the assets forming the asset pool is provided by the originating owner. The catalog or listing of assets may be transmitted electronically from the originating owner using a computer accessible through a wide area network or it may be delivered in hardcopy form. This catalog of technology assets includes at least one of a patent, trade secret, know-how, documentation, prototypes, pre-production units, production samples, tooling, and demonstration frameworks, and corresponds to a first pool of technology assets having subject matter in common. The development entity also receives title to at least some of the assets comprising the asset pool, but may also receive licenses to certain categories of assets such, for example, as trademarks or patents the originating owner has a legitimate need to retain. As noted above, in one embodiment, in exchange for this contribution of assets, the originating owner acquires an equity interest (e.g., a 20% ownership interest) in the development entity, along with the aforementioned re-acquisition option.

At 304, in one embodiment, the development entity receives seed capital from a primary investor in exchange for an equity interest (e.g., a controlling interest). The process proceeds to 306 wherein a first development incubator unit is established and assigned the task of developing ideas and product concepts utilizing an acquired asset pool as the foundation. The incubator unit includes a team of engineers and technical staff members and may, optionally, include managerial, marketing and sales staff. To maximize efficiency, however, centralized functions such as legal, human resources, facilities management and other infrastructure functions, are performed by a consolidated team which supports all of the incubator units. In addition, engineers and other technical staff may be shared among development incubator units. In one embodiment, an equity stake is provided to selected members of each incubator unit, the goal being to foster an entrepreneurial atmosphere that is likely to be different from that fostered by the originating owner.

In one embodiment, at 308, a first new product concept relating to the asset pool is selected for development activity by the incubator unit. As innovation activity gives rise to new inventions, know-how, and other proprietary rights, appropriate protection is applied for and corresponding new assets are added to the asset pool. In one embodiment at 310, the costs expended by each incubator unit are tracked in a database. These costs include those expended to develop any new product concepts, those associated with the acquisition of proprietary rights, and a share of the administrative overhead associated with operating the development entity.

In one embodiment, at decision block 312, a determination is made as to whether the originating owner wishes to exercise the re-acquisition option (i.e., pay a fee and re-acquire the pool of assets that includes any improvements as well as all necessary personnel). If yes, the process proceeds to 316 whereupon the assets and employees are reassigned to the originating entity. If no, then the process advances to 314.

In one embodiment, at 314, a spin-off is formed through a capital investment by one or more secondary (e.g., Series A) investors whose investment makes it possible to purchase from an enhanced asset pool from the development entity, thereby providing the originating owner, primary investor, and others having an equity stake in the development entity, with an opportunity to realize a prompt return on their initial investment. Of course, any combination of cash and equity may be conveyed by the newly formed spin-off entity in exchange for the enhanced asset pool. In any event, the process terminates at 317.

Figure 4:
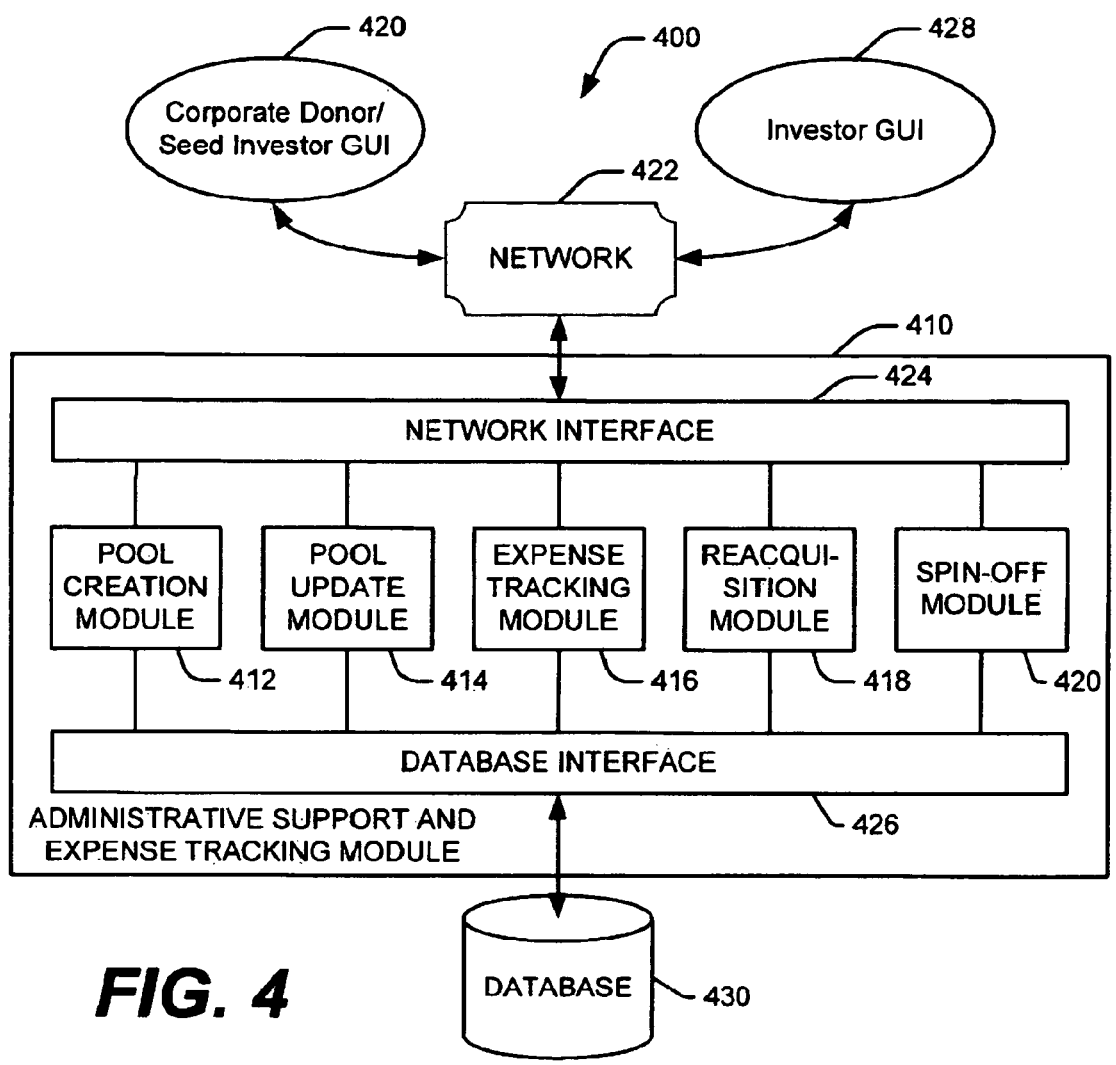
FIG. 4 is a block diagram depicting a system for creating and maintaining a dynamic portfolio of technology assets and tracking all costs and activities associated with their further development

Many of the processes described above may be implemented by a computer system, such as the system 400 depicted in the block diagram of FIG. 4. In one embodiment, a user-friendly graphical user interface 420 ("GUI") facilitates access for the originating owner and primary investor over a network 422, such as the Internet, to a server 410, such as a secure web portal server, where various transactions and operations related to monitoring development activity and associated costs may be performed. In one embodiment, an Investor GUI 428 facilitates investor access. The server 410 either contains or is coupled to a searchable database 430. In one embodiment, server 430 functions as an administrative support and expense tracking server.

The server in one embodiment includes a pool creation module 412, a pool update module 414, an expense tracking module 416, a reacquisition module 418, and a spin off module 420. The modules within server 430 communicate with network 422 by way of a network interface 424 and with the database 430 by way of a database interface 426.

In one embodiment, database 430 contains indexed information describing the portfolio of assets. For example, the assets can be indexed within the database according to a variety of aspects. In one example, an asset table is used reflecting a portfolio of assets. Each row in the asset table corresponds to an asset from a pool of assets. Each asset is assigned an asset identifier as well as a cost identifier. With particular reference to those assets which are created during innovating activity within a corresponding incubator unit, costs may be allocated to each asset on a pro-rate basis. Thus, for example, if the development activity associated with the development of a new product concept results in the creation of four patent applications, the cost of all activity may be equally apportioned to each of the patent applications. In one embodiment the asset table further includes an encumbrance identifier to identify whether a license interest has been previously granted to any third party by the originating owner, as well as an incubator unit identifier to identify which development team within the development entity is responsible for further development activity.

With continuing reference to FIG. 4, it will be seen that in one embodiment pool creation module 412 can be used through the GUI 420 by the originating owner and primary investor(s) to establish discrete pools of assets and assign the pool of assets to an incubation unit at the time of transfer. The pool update module 414 can be used through the GUI 420 in one embodiment to modify the list of assets assigned to a pool of assets and to perform related operations concerning the pool of assets. The GUI 420 can be used in one embodiment to monitor the progress and costs of development activity maintained by expense tracking module 416 and determine the current re-acquisition fee as computed by re-acquisition module 418.

Figure 5:
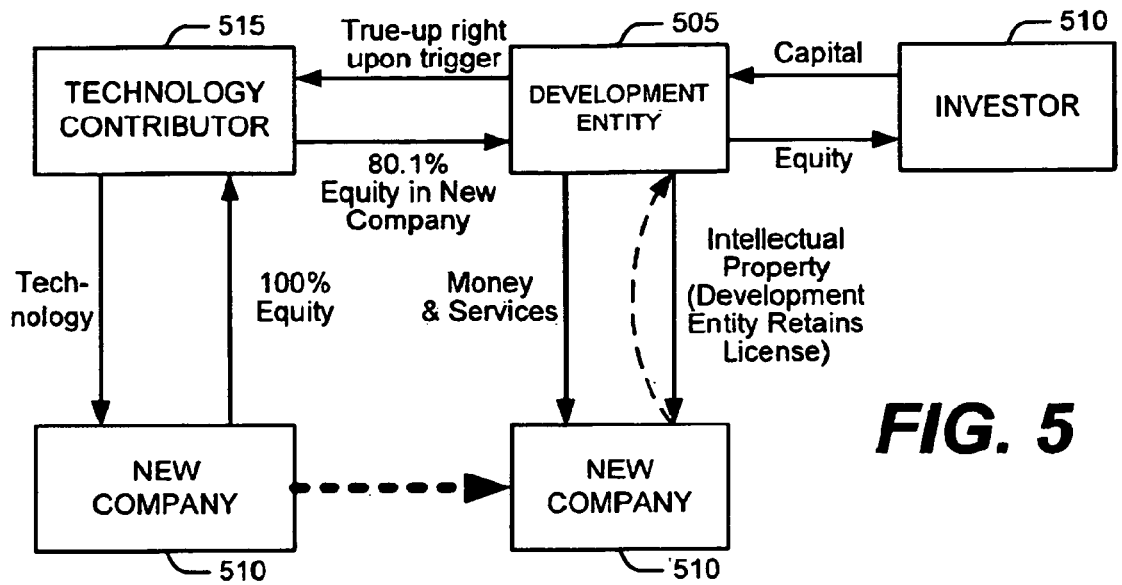
Figure 6:
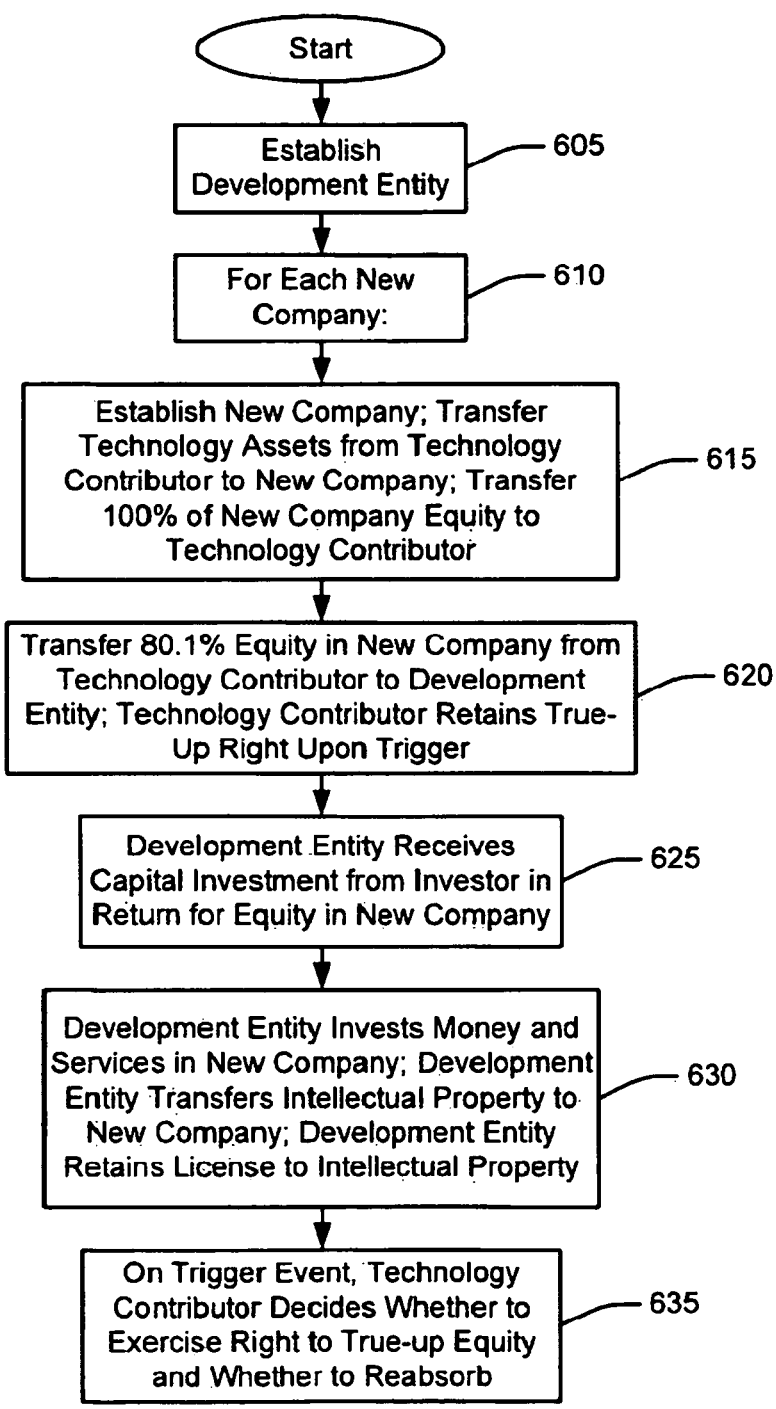
FIG. 6 is a flowchart depicting one non-limiting example showing unutilized, non-core technology assets from a Technology Contributor being transformed by a Development Entity through subsequent development activity into a more refined class of assets owned by a New Company that can be re-acquired by the Technology Contributor.

FIG. 5 illustrates another embodiment of a system for developing technology assets in which a single Development Entity can support the development of technology contributed by one or more Technology Contributors. FIG. 6 illustrates the process that is followed to develop technology assets through the embodiment shown in FIG. 5.

In one embodiment, the process begins at 605 by establishing a Development Entity 505. In one embodiment, the Development Entity 505 can be staffed by engineers, scientists, and other personnel transferred, loaned, or seconded from another company. Further, in addition to or instead of these personnel, the Development Entity may hire personnel using conventional hiring techniques.

In one embodiment, at 615, a New Company 510 is established. In one embodiment, a Technology Contributor 515 transfers technology assets from the Technology Contributor 515 to the New Company 510 in exchange for 100 percent of the New Company's equity.

In one embodiment, at 620, the Technology Contributor 515 transfers 80.1 percent of the equity it owns in the New Company 510 to the Development Entity 505. Immediately after the transfer, the Technology Contributor 515 owns 19.9 percent of the equity in the New Company 510. Because the Technology Contributor 515 owns less than 20 percent of the stock in the New Company 510, the Technology Contributor 515 is not obligated to reflect the profits and losses of the New Company 510 on its books.

In one embodiment, in return for the transfer of equity, the Technology Contributor 515 receives a true-up right and a re-acquisition right. In one embodiment, one or both of the rights are contractual and are captured in a written contract. In one embodiment, one or both of the rights mature upon the occurrence of a trigger. The trigger for the true-up right may be different from the trigger for the re-acquisition right. There are many possible triggers, including a new round of funding, an offer for sale of the New Company, an offer to purchase the New Company, a fixed time (e.g., 1 year) or declaration by the board of directors of the Development Entity that the option has ripened. These are merely examples. A person of ordinary skill would recognize that many other triggers exist.

In one embodiment, the true-up right is the right of the Technology Contributor 515 to receive an accounting of the true value of its equity at the time that the trigger occurs. The accounting takes into account the value of the technology assets originally contributed by the Technology Contributor 515 to the New Company 510, the value of the technology developed by the Development Entity 505 and transferred to the New Company 510, and the amount of dilution that may have occurred because of investments by other investors.

In one embodiment, a valuation may occur each time technology assets or funds are contributed to the New Company. In one embodiment, the valuation is performed according to industry standards for such activities and may be done by a consultant that specializes in such valuations. In one embodiment, the valuation is done by negotiation based on technology risk and market risk. In one embodiment, the valuation varies in inverse proportion to those risks; that is, the smaller the risk, the higher the valuation. In addition, the valuation will depend on the size of the market being addressed and the amount of time that it is expected to be necessary to penetrate the market.

In one embodiment, the valuation also takes into account the services performed by the Development Entity 505, and the funds expended by the Development Entity 505, on behalf of the New Company 510. In one embodiment, the equity in the New Company 510 owned by the Development Entity 505 increases with its investments in services and funds on behalf of the New Company 505.

In one embodiment, the valuation also takes into account equity awarded to Development Entity personnel to encourage the development of the technology necessary for the New Company 510 to launch products.

In one embodiment, it is assumed that, by the time the trigger occurs, the Technology Contributor 515 will own 19.9 percent, the Development Entity personnel will own 20 percent, and the Development Entity 505 and any seed investors that invest at the same time as the Development Entity 505 will own 60 percent of the New Company. The less development the technology requires, the less this assumption is true. As the Development Entity invests more funds and services in the New Company it earns its percentage of New Company equity. If the technology invested by the Technology Contributor is ready for market, or nearly so, the Development Entity will have to do less work and will consequently earn less of its percentage. The variations from assumed investments are accounted for in the true-up process. In one embodiment, the true-up process adopts these percentages without a formal or informal valuation process.

In one embodiment, the re-acquisition right is the right of the Technology Contributor 515 to re-acquire the New Company 510 upon the occurrence of the trigger. In one embodiment, the Technology Contributor 515 agrees to pay a fixed multiple of any investor contribution to the New Company 510. For example, if the multiple is 5 and the investor contribution to the New Company 510 is one million dollars, the Technology Contributor 515 must pay five million dollars for the acquisition. The acquisition itself is performed in a conventional manner.

Returning to FIGS. 5 and 6, at 625, in one embodiment the Development Entity 505 receives a capital investment from one or more Investors 520. In return, the Investors 520 receive equity in the New Company 510. The capital contribution by the Investors 520 is a factor in subsequent valuations, as described above.

At 630, in one embodiment the Development Entity 505 invests money and services in the New Company 510. The Development Entity has technologists (e.g., engineers, scientists, programmers, etc.) that work on projects to develop technology and products for the New Company. As the Development Entity develops technology, that technology and the associated intellectual property is assigned to New Company. In most, if not all, cases the Development Entity retains a license to the technology that it transfers. In some cases, the Development Entity may develop technology that is not core to the New Company. In those cases, the Development Entity may not transfer the technology to the New Company.

As time progresses, the Development Entity develops new technology and perhaps new products that may be released into the market. As a result, the value of the technology and new products and the value of the New Company may increase.

At 635, a trigger event occurs. As discussed previously, a New Company 510 may have any number of trigger events. In one embodiment, when the trigger event occurs, the Technology Contributor 515 must decide whether to exercise the true-up right or whether to reabsorb the New Company. In one embodiment, the Technology Contributor is given notice that the trigger has occurred and that a true-up will occur. In one embodiment, the same notice starts a notice period for the Technology Contributor to exercise its option to re-acquire the New Company. In one embodiment, the Technology Contributor has 30-45 days to exercise the option, although it will be understood that the notice period can be any reasonable period of time.

In one embodiment, the Technology Contributor 515 is not required to exercise either the true-up right or the re-acquisition right. However, since the next step for the New Company 510 is likely to be seeking a new round of funding, which will dilute the Technology Contributor's ownership of the New Company, it is unlikely that the Technology Contributor will not exercise the true-up right if it does not exercise the re-acquisition right. In one embodiment, the Technology Contributor is contractually required to exercise either the true-up right or the re-acquisition right.

Figure 7:
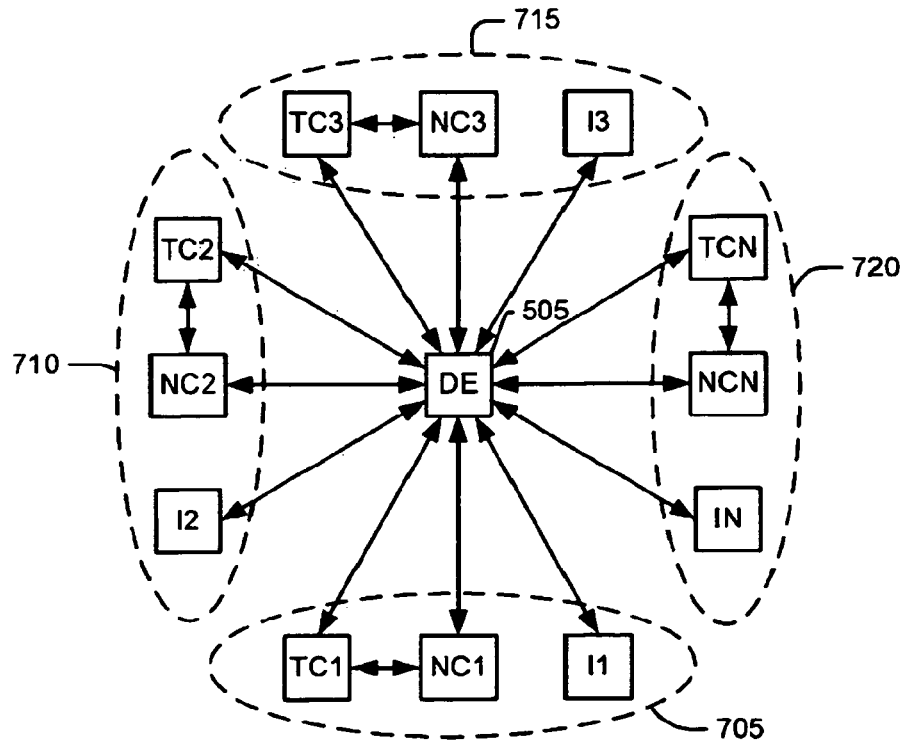
FIG. 7 is a conceptual block diagram of one non-limiting example showing a single Development Entity developing technology for a number of Technology Contributor/New Company/Investor groups.

As shown in FIG. 7, in one embodiment the same Development Entity 505 (abbreviated "DE") can have the relationship described above with more than one set of Technology Contributors (abbreviated "TC"), New Companies (abbreviated "NC"), and Investors (abbreviated "I"). In FIG. 7, the Development Entity has interfaces with a first group 705, consisting of TC1, NC1, and I1, a second group 710, consisting of TC2, NC2, and I2, a third group 715, consisting of TC3, NC3, and I3, and other groups up to an Nth group 720, consisting of TCN, NCN, and IN.

FIG. 8 illustrates one possible organization of the Development Entity 505 that accommodates more than one sets of Technology Contributor, New Company, and Investor, such as is shown in FIG. 7. In one embodiment, the Development Entity 505 includes a plurality of Developer Incubator Units 805, which are similar in form and function to the Developer Incubator Units 16, 18, 20 illustrated in FIG. 1 and described above. A Consolidated Administrative Support and Expense Tracking System ("CASETS") interfaces with the Technology Contributors 815, New Companies 820, and Investors 825. For clarity, other interfaces shown in FIG. 7 are not shown in FIG. 8.

Figure 10:
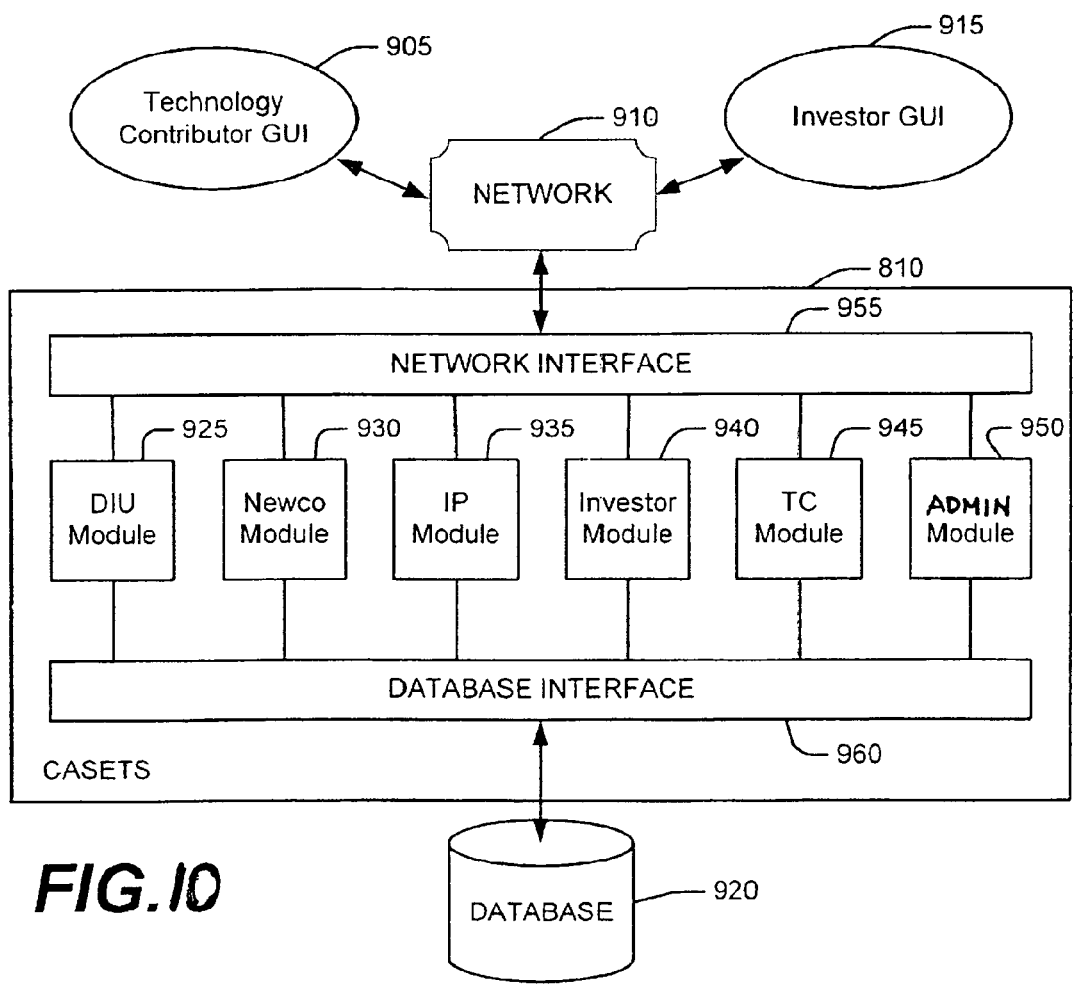
FIG. 10 illustrates one non-limiting example of functions associated with various modules within the Consolidated Administrative Support and Expense Tracking System.

In one embodiment, the CASETS block, which is illustrated in greater detail in FIGS. 9 and 10, manages the flow of property rights to and from the various entities illustrated in FIGS. 7 and 8. It manages the assignment of costs associated with the services and funds provided to the various New Companies, the transfer of technology to the New Companies, and the retention of licensing rights by the Development Entity. It manages the triggers for the true-up rights and the re-acquisition right. It also performs many of the traditional overhead functions, such as accounting, human resources, legal, information technology, etc., for the Development Incubator Units 805 and for the New Companies. It will be understood that the CASETS block 810 could be entirely within the Development Entity 505, as shown in FIG. 9, or it could be located in another entity shown in FIG. 9. Alternatively, it could be distributed across two or more of the entities shown in FIG. 9.

In one embodiment, a user-friendly GUI 905 facilitates access for the originating owner and primary investor over a network 910, such as the Internet, to the CASETS block 810, which may be a server, where various transactions and operations related to monitoring development activity and associated costs may be performed. In one embodiment, an Investor GUI 915 facilitates investor access. In one embodiment, the CASETS block 810 either contains or is coupled to a searchable database 920. The database 920 may be localized to the location of the Development Entity 505 or it may be distributed geographically among one or more of the Development Entity 505, the Technology Contributors 815, the New Companies 820, and the Investors 825.

In one embodiment illustrated in FIGS. 9 and 10, the CASETS block 810 includes a Developer Incubator Unit ("DIU") Module 925, a New Company ("Newco") Module 930, an Intellectual Property ("IP") Module 935, an Investor Module 940, a Technology Contributor ("TC") Module 945, and an Administrative ("Admin") Module 950. The modules within the CASETS block 810 communicate with network 910 by way of a network interface 955 and with the database 920 by way of a database interface 960. Further, while the modules are shown in FIGS. 9 and 10 as having distinct functions, it will be understood that the functions can be transitioned from one module to another. In addition, the functions can be inter-related through the use of, for example, a relational database system.

As indicated in FIG. 10, in one embodiment the DIU Module 925 tracks intellectual property as it is developed. It tracks invention disclosures, patent applications, patents, and other manifestations of intellectual property. In particular, the DIU Module 925 tracks which Development Incubator Unit developed a particular item of intellectual property so that an assignment to the appropriate New Company can later be accomplished.

In one embodiment, the DIU Module 925 also tracks the time expended by Development Entity personnel in support of a given Development Incubator Unit and the costs incurred, such as by the use of capital equipment, parts, research laboratories, manufacturing test beds, etc., can be later taken into account in a true-up calculation.

In one embodiment, the Newco Module 930 tracks the technology that has been transferred to each New Company and the licenses retained by the Development Entity. In addition, the Newco Module 930 tracks the services and funds provided to the New Companies.

In one embodiment, the Investor Module 935 tracks for each New Company: (a) the identity of the investors, (b) the amount each investor contributed, (c) the equity transferred to each investor, and (d) the investment terms.

In one embodiment, the TC Module 940 tracks for each New Company to which a Technology Contributor has contributed technology, the technology contributed to the New Company, the equity contributed to the Development Entity, and the investment terms, including a description of the terms of the true-up right and the re-acquisition right.

In one embodiment, the IP Module 945 provides tools for tracking intellectual property. It provides tools for: (a) invention disclosure creation and tracking; (b) patent application tracking and docketing; and (c) patent tracking, including tracking the payment of maintenance fees. Other, similar tools may be provided for trademarks, trade secrets, copyrights and other forms of intellectual property and technology.

In one embodiment, the IP Module 945 also tracks the intellectual property developed by the Development Entity, whether the intellectual property has been transferred and to whom it has been transferred, and whether a license has been retained.

In one embodiment, the Admin Module 950 provides all of the administrative functions including human resources, accounting, legal, and true-up and re-acquisition management.

In one embodiment, true-up management includes retrieving cost information from the DIU Module, Development Entity investment information from the NewCo Module, outside investor information from the Investor Module, information regarding the Technology Contributor's technology contribution and equity contribution and the investment terms under which those contributions were made. In one embodiment, true-up management presents some or all of those factors and a true-up cost is computed manually or another system computes the true-up cost. In one embodiment, the Admin Module 950 computes the true-up amount.

Similarly, in one embodiment the Admin Module 950 uses similar information to present the factors necessary for the Technology Contributor to re-acquire the New Company. In one embodiment, the Admin Module 950 computes the re-acquisition amount.

In one embodiment, each module's data is be stored in records in separate tables in database 920. In one embodiment, such tables are related in a relational database using traditional techniques. In one embodiment, the records are stored in fewer tables with several modules sharing one or more tables. In one embodiment, all of the data is stored in a single table.

Having described methods, apparatuses and articles of manufacture for extracting value from a large portfolio of assets, it is believed that other modifications, variations and changes will be suggested to those skilled in the art in view of the teachings set forth herein. It is therefore to be understood that all such variations, modifications and changes are believed to fall within the scope of the present invention. Although specific terms are employed herein, they are used in their ordinary and accustomed manner only, unless expressly defined differently herein, and not for purposes of limitation.

What is claimed is:

1. A method for developing and tracking technology assets in a computer system, said method comprising:

receiving from an originating owner a first catalog of technology assets including at least one of a patent, trade secret, know-how, documentation, prototypes, pre-production units, production samples, tooling, and demonstration frameworks, said first catalog corresponding to a first pool of technology assets having a subject matter in common;

receiving from said originating owner, at said development entity, title to said first pool of technology assets in exchange for an equity interest in said development entity and an option to re-acquire the first pool of technology assets for a reacquisition fee;

receiving from at least one primary investor, a capital investment in exchange for an equity interest in said development entity;

storing information about the received first catalog and title to said first pool in one of at least one database, wherein both said development entity and said primary investor are enabled to access the one of at least one database by use of a database interface;

selecting a first new product concept from said first pool of technology assets for development activity by the development entity;

tracking, in one of at least one database, costs expended by the development entity to develop said first new product concept and to acquire proprietary rights associated with said first new product concept and associating said costs with the stored information, wherein both said development entity and said primary investor are enabled to access the one of at least one database by use of a database interface; and transferring said first pool of technology assets, including results of all development activity relating to said first new product concept, to a first spin-off entity unless the originating owner tenders the reacquisition fee, wherein said first spin-off entity is enabled to access said one of at least one database upon transfer.

2. The method of claim 1, said method further including:

receiving from said originating owner a second catalog of technology assets including at least one of a patent, trade secret, know-how, documentation, prototypes, pre-production units, production samples, tooling, and demonstration frameworks, said second catalog corresponding to a second pool of technology assets having a subject matter in common;

receiving from said originating owner, at said development entity, title to said second pool of technology assets in exchange for an additional equity interest in said development entity and an option to re-acquire the second pool of technology assets for a reacquisition fee;

storing information about the received second catalog and title to said second pool in one of at least one database, wherein both said development entity and said primary investor are enabled to access the one of at least one database by use of a database interface;

selecting a second new product concept from said second pool of technology assets for development activity by the development entity;

tracking, in one of at least one database, costs expended by the development entity to develop said second new product concept and to acquire proprietary rights associated with said second new product concept and associating said costs with the stored information, wherein both said development entity and said primary investor are enabled to access the one of at least one database by use of a database interface; and transferring said second pool of technology assets, including results of all development activity relating to said second new product concept, to a second spin-off entity unless the originating owner tenders the reacquisition fee, wherein said first spin-off entity is enabled to access said one of at least one database upon transfer.

3. The method of claim 2, said method further including:

receiving from a second originating owner a third catalog of technology assets including at least one of a patent, trade secret, know-how, documentation, prototypes, pre-production units, production samples, tooling, and demonstration frameworks, said third catalog corresponding to a third pool of technology assets having a subject matter in common;

receiving from said second originating owner, at said development entity, title to said third pool of technology assets in exchange for an equity interest in said development entity and an option to re-acquire the third pool of technology assets for a reacquisition fee;

storing information about the received third catalog and title to said third pool in one of at least one database, wherein both said development entity and said primary investor are enabled to access the one of at least one database by use of a database interface;

selecting a third new product concept from said third pool of technology assets for development activity by the development entity;

tracking, in one of at least one database, costs expended by the development entity to develop said third new product concept and to acquire proprietary rights associated with said third new product concept and associating said costs with the stored information, wherein both said development entity and said primary investor are enabled to access the one of at least one database by use of a database interface; and transferring said third pool of technology assets, including results of all development activity relating to said third new product concept, to a third spin-off entity unless the second originating owner tenders the reacquisition fee, wherein said first spin-off entity is enabled to access said one of at least one database upon transfer.

4. The method of claim 1, wherein selecting a first new product concept includes analyzing several product concepts having common subject matter related to said first pool of technology assets, analysis being with respect to at least one of marketability, patentability, and technical feasibility.

5. The method of claim 4, wherein tracking further includes tracking costs associated with said selecting.

6. The method of claim 1, wherein said re-acquisition fee is calculated as the product of the costs tracked during said tracking and a scale factor negotiated by said originating owner and said at least one primary investor.

7. The method of claim 1, further including: upon payment of the reacquisition fee to the at least one primary investor, transferring title to the first pool of technology assets back to the originating owner.

8. The method of claim 1, further including: upon payment of the reacquisition fee to the at least one primary investor and at least one member of a development team responsible for development activity associated with the first new product concept, transferring title to the first pool of technology assets back to the originating owner.

9. The method of claim 1, further including: transforming said first new product concept into a developed new product suitable for commercialization, said tracking including tracking costs associated with said transforming.

10. The method of claim 1, wherein transforming the first new product concept into a developed new product includes obtaining a degree of proprietary protection by filing and prosecuting at least one patent application covering the novel elements of said first new product concept.

11. The method of claim 1, wherein said at least one primary investor receives a controlling interest in the development entity in exchange for said capital investment.

* * * * *